(12) United States Patent
Aebker

(10) Patent No.: US 7,988,392 B2
(45) Date of Patent: Aug. 2, 2011

(54) TONNEAU OR CARGO COVER SUPPORT SYSTEM AND METHOD

(75) Inventor: Paul T. Aebker, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 580 days.

(21) Appl. No.: 11/968,412

(22) Filed: Jan. 2, 2008

(65) Prior Publication Data

US 2009/0169320 A1 Jul. 2, 2009

(51) Int. Cl.
*B60P 7/08* (2006.01)

(52) U.S. Cl. .......................................................... 410/89

(58) Field of Classification Search .................... 410/89, 410/96, 97, 117, 118, 129, 143, 144; 24/302, 24/265 CD; 296/37.8; 248/499
See application file for complete search history.

(56) References Cited

U.S. PATENT DOCUMENTS

| | | | |
|---|---|---|---|
| 2,649,054 A * | 8/1953 | Rueckert | |
| 5,685,470 A | 11/1997 | Moore | |
| 5,685,592 A | 11/1997 | Heinz | |
| 5,800,106 A * | 9/1998 | Miller | 410/117 |
| 5,924,611 A | 7/1999 | Mizuno | |
| 6,109,846 A * | 8/2000 | Davis et al. | 410/100 |
| 6,302,463 B1 | 10/2001 | Moore et al. | |
| 6,406,083 B2 | 6/2002 | Bharj et al. | |
| 6,749,241 B1 | 6/2004 | Erlandsson et al. | |
| 6,793,449 B1 | 9/2004 | Simpson et al. | |
| 6,899,256 B2 | 5/2005 | Richter | |
| 6,908,269 B1 | 6/2005 | Youngs et al. | |
| 7,052,063 B2 | 5/2006 | Haspel et al. | |
| 2006/0022479 A1 | 2/2006 | Mulvihill et al. | |

FOREIGN PATENT DOCUMENTS

JP 2001018723 1/2001
* cited by examiner

*Primary Examiner* — Stephen Gordon
(74) *Attorney, Agent, or Firm* — Knealy Vaidya LLP; Mark E. Duell

(57) ABSTRACT

A cargo support and storage system for use in a vehicle and method is provided and includes a first stabilizing element having a primary end and a secondary end. The primary end of the first stabilizing element is extendible from a first sidewall to a second sidewall of the vehicle. A second stabilizing element can include a primary end and a secondary end, the primary end of the second stabilizing element being extendible from the first sidewall to the second sidewall of the vehicle. The first and second stabilizing elements are spaced away from and substantially parallel to each other, and can be formed as belts. When in use, the first and second stabilizing elements can be maintained in tension, but can be removed or retracted when not in use so that they do not take up space in the cargo area of the vehicle. A storage box can be provided and tailored to include extension that mate with the stabilizing elements such that the box can be hung in the cargo area. The cargo support and storage system according to the disclosed subject matter provides for a lower cost, lower weight and space efficient solution to cargo storage needs in a vehicle.

18 Claims, 4 Drawing Sheets

TONNEAU OR CARGO COVER SUPPORT SYSTEM AND METHOD

BACKGROUND

1. Field

The presently disclosed subject matter relates to a cargo support system for a vehicle and more particularly, to a cargo support system that utilizes tensioned belts to support and stabilize cargo loads.

2. Brief Description of the Related Art

Most vehicles have areas for the storage of cargo. Automobiles typically have a trunk, rear seat area or hatch back area for the storage of cargo, while sport utility vehicles (SUVs) typically provide a rear cargo storage area. In general, these storage areas provide an empty space where cargo can be held for transport.

Cargo stored in the trunk, rear seat areas and rear cargo storage described above are often subject to disturbance caused by abrupt movements of the vehicle. For example, groceries and goods placed in the rear cargo storage area of an SUV may dramatically shift during transport and, in some case, may become damaged.

In order to address the need for stable cargo storage in a vehicle, various solutions have been proposed. One such method has been to provide hooks in a vehicle's storage area. These hooks are situated on an inside wall of the vehicle cargo area, or relatively vertical surface of the vehicle cargo area, and at a location above the relatively horizontal surface upon which a cargo is intended to "rest." Typically, the hooks are permanent fixtures in the vehicle and designed to allow a user to place the handles of a storage bag around it, thereby stabilizing the handles of the storage bag in hopes of stabilizing the storage bag and its contents.

There are several drawbacks to such hooks. First, it often is difficult to place cargo in a storage bag. Even if a storage bag can be used, it may be difficult to use the hooks described above because of difficulty placing the storage bag on a hook, as well as removing it from a hook. This occurs because the hooks are against a sidewall, which may serve as an obstacle, and because they are against a sidewall, one has to reach a certain distance into the vehicle to use the hook. Second, it often is difficult to grasp the handles of a bag from a hook because the handles often are "stretched" (or rather elongated) because the hook is not flexible. When the handles of a bag are stretched, or elongated, or twisted, the openings of the handles become difficult to discern, both with one's eyes and with one's hands. Third, a relatively limited number of bags can be placed on each hook. If the bags are roughly the same size, there is only a limited amount of "floor" space available for bags intended for a given hook because each bag's handles must be placed on the hook. Fourth, if there are a large number of bags, many hooks will be needed. In this regard, when more hooks are needed, the additional hooks become more difficult to reach. Fifth, it is possible for a bag to become separated from a hook, as there is nothing to maintain the handles of a bag in place on a hook. Consequently, loading bags on hooks and removing bags from hooks, as well as from the vehicle, is quite cumbersome and can be rather difficult.

Another method for addressing the problems inherent in transporting cargo is a net-type device, sometimes referred to as a "cargo net." Typically, such nets extend between two points in a vehicle. For example, in an SUV, a net may extend between the two sidewalls of the rear section, or cargo area, of the vehicle. Generally, the net itself may have two sidewalls, connected at the bottom, and an open top for receiving cargo, i.e., various items, including plastic grocery bags. Thus, such a net has a generally V-shaped or generally U-shaped cross-section. Also, the sidewalls of a net may be flexible to accommodate bags or items of various sizes.

There are several drawbacks, however, to cargo nets. First, as opposed to the hooks that typically are permanently-fixed features of an automobile, nets need to be set-up and taken-down. Otherwise, a net would use too much valuable cargo space when a net was not necessary, e.g., when transporting pieces of furniture. Accordingly, using a net takes time, and typically needs to be stowed for extended periods of time. Second, the net is inherently cumbersome to use in that it is prone to tangling unless it is always set-up in its ready-to-use mode. Third, a net has limited flexibility and accordingly has a somewhat limited capacity. Forth, a net may take up the entire cargo space and not allow room for cargo that is not shaped to fit inside the cargo net.

Yet another method for addressing the problems inherent in transporting cargo in a vehicle is to provide containment areas. Typically, these containment areas are areas smaller than the trunk of a sedan or the cargo area of an SUV and devoted to holding a small number, sometimes even a single container. Typically, a containment area is a prominently-visible compartment that is sometimes a compartment recessed into the floor surface or sidewall of a vehicle. In some vehicles, however, such as SUVs or station wagons, the floor surface of the rear section will lift up and reveal a containment area devoted to holding a cargo container. Such a hidden containment area may have one or more compartments designed for this purpose. In this way, the compartments provide a certain amount of sidewall to support individual cargo container. Further, a containment area may be equipped with flexible cords or other devices or features to help provide additional support.

There are several drawbacks, however, to containment areas. First, containment areas provide limited stability to the cargo they are designed to store and stabilize. Even if additional support features are provided, use of these features makes containment areas more difficult to use by requiring several steps to stabilize an item. Second, there is a limited amount of space provided to stabilize items in a containment area, and usually more limited in a hidden containment area. This drawback is common to most areas specially designed to stabilize items. Third, containment areas usually have very little flexibility, e.g., to accommodate items of varying and/or odd size and/or shape. Fourth, containment areas are often difficult to use. For example, as just described, items may not quite fit easily in a containment area. Also, hidden containment areas may be more difficult to use than visible containment areas. For example, lifting up a section of the floor surface of the cargo area of an SUV requires that section of floor surface to be free of items or requires one to relocate whatever may be on top of that surface before accessing the hidden compartment area. Thus, in light of their many disadvantages, containment areas are underutilized.

Another device that provides containment areas for addressing the problems inherent in transporting cargo is that of an organizer. As with a net, an organizer would need to be set-up and taken-down so that the entire cargo area can be put to other uses. An organizer usually is a structure that is separate from the vehicle, but can be placed in a vehicle to provide a number of smaller containment areas to hold individual (or maybe a couple of) items. As with a hidden compartment (or even a prominently-visible and/or recessed compartment), such areas provide a degree of sidewall support that otherwise would not exist.

There are several drawbacks, however, to organizers for automobiles. First, such organizers require a relatively large amount of space when in use and when not in use. Most users do not welcome the idea of devoting a large amount of space in their automobile (and garage, etc.) to such devices. Second, assembly, or set-up, of such organizers is not easy and requires time. These first two drawbacks alone render an organizer an impracticable device for addressing the concerns raised herein. Third, when placing a bag in or taking a bag out of a compartment that is located too far into the interior of an automobile, it is difficult for one to reach such compartments. Fourth, as stated above, any defined compartment provides limited flexibility for accommodating odd-sized items. Thus, as with a net and a hidden compartment area, in light of its many disadvantages, organizers are left underutilized.

Another device that is used for storing cargo in a vehicle's storage area is a hard tonneau. A hard tonneau generally includes an internal support structure made up of a ribbing or steel tubing to support the hard tonneau cover. The tonneau itself is generally a planer structure made of plywood, injection molded plastic or blow molded plastic. Such tonneaus provide an additional flat plane upon which cargo can be stored, but may not be capable of handling heavy loads because of the limitations of the support structure. Furthermore, such tonneaus take up a significant amount of space in the vehicle's cargo area and cannot be easily removed from the cargo area.

In view of the above and other drawbacks of the conventional devices, there is a need for a cargo system and method that, among other features, can be stowed away when not in use, assists with the storage of heavy objects and/or objects in a variety of shapes, and does not take up the entire cargo storage area of a vehicle even when in use.

SUMMARY

The disclosed subject matter addresses the characteristics and drawbacks in the conventional devices described above by providing a cargo support and storage system and method that provides a light weight, low cost solution that can be implemented in a variety of vehicles. According to an aspect of the disclosed subject matter, a cargo support and storage device can include first and second stabilizing elements that are spaced apart from and substantially parallel to each other. The first and second stabilizing elements can be retained in tension at the sidewalls of a vehicle through the use of hooks and tie downs affixed to the vehicle sidewalls.

According to an aspect of the disclosed subject matter, a cargo support and storage system for a cargo area of a vehicle can include a first vehicle sidewall including first and second secondary attachment structures located thereon, a second vehicle sidewall including first and second primary attachment structures located thereon, a first stabilizing element having a primary end with a primary securing structure and a secondary end with a secondary securing structure, the first stabilizing element being extendible from the first secondary attachment structure of the first sidewall to the first primary attachment structure of the second sidewall, and a second stabilizing element having a primary end with a primary securing structure and a secondary end with a secondary securing structure. The second stabilizing element can be extendible from the second secondary attachment structure of the first sidewall to the second primary attachment structure of the second sidewall. The second stabilizing element can also be spaced away from and substantially parallel to the first stabilizing element when the first stabilizing element and second stabilizing element are extended and the first stabilizing element primary securing structure is attached to the first primary attachment structure of the second vehicle sidewall, the first stabilizing element secondary securing structure is attached to the first secondary attachment structure of the first vehicle sidewall, the second stabilizing element primary securing structure is attached to the second primary attachment structure of the second vehicle sidewall, and the second stabilizing element secondary securing structure is attached to the second secondary attachment structure of the first vehicle sidewall.

According to another aspect of the invention, one side of the first and second stabilizing elements can be clamped at one of the vehicle sidewalls through the use of a retractor mechanism. The retractor mechanism allows the stabilizing elements to be clamped in place so that they can be maintained in tension. The retractor mechanism is also capable of coiling and storing the stabilizing elements when they are not in use so that the vehicle's cargo area is open. The retractor's clamping mechanism may be automatically or manually engaged.

According to another aspect of the disclosed subject matter, the stabilizing elements can be belt shape, cord-like in shape or a shape having a rectangular cross sectional area.

According to another aspect of the invention, the stabilizing elements have a belt shape wherein the length of a longitudinal side of the stabilizing element that is parallel to the first sidewall is larger than a thickness of the stabilizing element which is in a direction perpendicular to the first sidewall.

According to another aspect of the disclosed subject matter, the first and second stabilizing elements are made of a flexible material capable of deflection upon application of a load.

According to another aspect of the disclosed subject matter, a cargo support and storage system is provided which includes a first stabilizing element having a primary end and a secondary end, the primary end of the first stabilizing element extendible from a first sidewall to a second sidewall, a second stabilizing element having a primary end and a secondary end, the primary end of the second stabilizing element extendible from the first sidewall to the second sidewall, the second stabilizing element spaced away from and substantially parallel to the first stabilizing element when the first stabilizing element and second stabilizing element are extended and a storage box having a container region and a container top, the container top capable of being fitted onto a top section of the container region, the container region being capable of fitting between the first and second stabilizing elements and the container top having a first extension portion capable of being retained by the first stabilizing element and a second extension portion capable of being retained by the second stabilizing element Still other aspects, features, and attendant advantages of the disclosed subject matter will become apparent to those skilled in the art from a reading of the following detailed description of embodiments constructed in accordance therewith, taken in conjunction with the accompanying drawings.

BRIEF DESCRIPTION OF THE DRAWINGS

The disclosed subject matter will now be described in more detail with reference to exemplary embodiments of the apparatus and method, given only by way of example, and with reference to the accompanying drawings, in which.

DETAILED DESCRIPTION OF EXEMPLARY EMBODIMENTS

Figure 1:
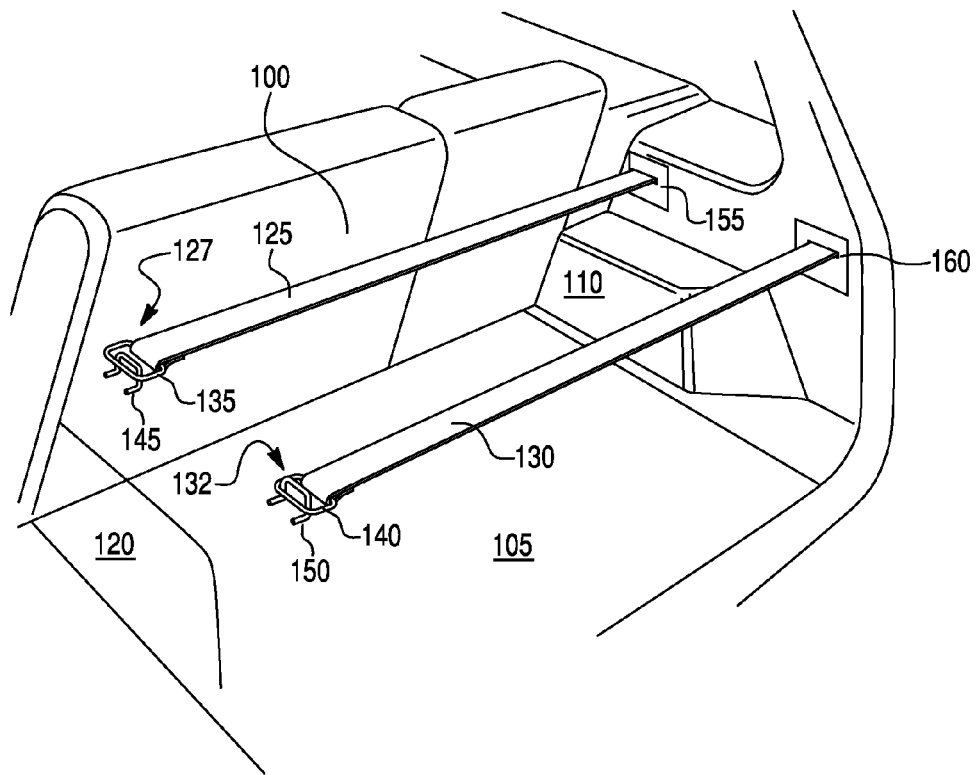
FIG. 1 illustrates a perspective view of an exemplary embodiment of a cargo support system made in accordance with principles of the disclosed subject matter.

The disclosed subject matter provides a system for supporting and stabilizing cargo. The system according to the disclosed embodiments occupies little space whether in use or not and can accommodate a large amount of cargo of varied shapes and sizes.

Although the following description illustrates the system according to the disclosed embodiments in the cargo area of an SUV, it should be understood that the system can be used in any automobile and in other areas of an automobile, such as the rear sear area or trunk, or in other vehicles, such as airplanes and trains.

Referring to the drawing figures, like reference numerals designate identical or corresponding elements throughout the several figures.

FIG. 1 illustrates a perspective view of an exemplary embodiment of a cargo support system 100 made in accordance with principles of the disclosed subject matter. FIG. 1 shows, from the perspective of one looking into the rear of an SUV, the cargo support system 100 which is provided in the cargo hold area 105 of a vehicle having a first sidewall 110 and a second sidewall 120. The cargo support system 100 includes first and second stabilizing elements that can be configured as a first belt 125 and a second belt 130, respectively. The stabilizing elements can each have a primary end with a primary securing structure and a secondary end with a secondary securing structure. For example, in the embodiment of FIG. 1, a primary end of the first belt 125 can be attached to the second sidewall 120 by a first hook 135 and a secondary end of the first belt 125 can be retained at the first sidewall 110 by a first retractor 155. Likewise, an end of the second belt 130 can be retained at the first sidewall 120 by a second retractor 160. The retractors 155 and 160 are described in greater detail below but generally serve to clamp the belts 125 and 130, thereby tensioning the belts 125 and 130. The retractors 155 and 160 can be tunable so that their tension can be adjusted depending upon the weight of the cargo to be placed on the belts 125 and 130. In this embodiment, a primary end 127 of the first belt 125 is provided with a first hook 135 and a primary end 132 of the second belt 130 is provided with a second hook 140. The second sidewall 120 of the cargo area 105 can also include sidewall attachment structures, which can be formed as a first tie down 145 and a second tie down 150. The first and second belts 125 and 130 are spaced away from and generally parallel to each other when attached to the first and second sidewall and across the cargo area. The first sidewall 120 can include first and second secondary attachment structures that can be, for example, formed as a tie down, a retractor, or other locking structure. When the attachment structure is configured as a retractor, the mating securing structure located on the stabilizing element can be considered a portion of the stabilizing element that attaches to and may be part of the retractor itself.

In operation, the first belt 125 and the second belt 130 may be fully retracted into the first and second retractors 155 and 160 respectively. At this point the cargo hold area 105 is open. In order to utilize the cargo support system 100, the first belt 125 is pulled away from the first retractor 150 toward to second sidewall 120. The first hook 135 engages the first tie down 145. The second belt 130 may also be pulled away from the second retractor 160 toward the second sidewall 120 so that the second hook 140 engages the second tie down 150. The retractors 155 and 160 clamp or otherwise limit movement of the belts 125 and 130, respectively, thus maintaining the belts 125 and 130 in tension. At this point, the first belt 125 and the second belt 130 traverse the cargo area 105 and the cargo support system 100 can be used to support a load by placing the load on top of the belts 125 and 130. As can be seen in FIG. 1, even when the cargo support system 100 is in use, there is additional space for storing cargo in the cargo area 105, such as below the belts 125 and 130.

It should be understood that the cargo area 105 may be any area in a vehicle capable of holding cargo, including but not limited to a vehicle trunk, hatchback area or the cargo region of a sport utility vehicle (SUV).

The belts 120 and 125 described above can be made of any material that is flexible and has a high tensile strength so that various loads can be placed on the belts. The material can be nylon, Kevlar, cotton, and many other similar fabrics and combinations thereof. The material can also be certain forms of plastic, woven metals, or banded ropes. The cargo support system 100 as shown in FIG. 1 provides a solution that is lighter, less expensive and more forgiving of larger cargo loads than conventional cargo storage systems. Furthermore, the retractors 155 and 160 allow the cargo support system 100 to be stowed away when it is not needed, thus freeing up the entire cargo area 105.

Figure 2:
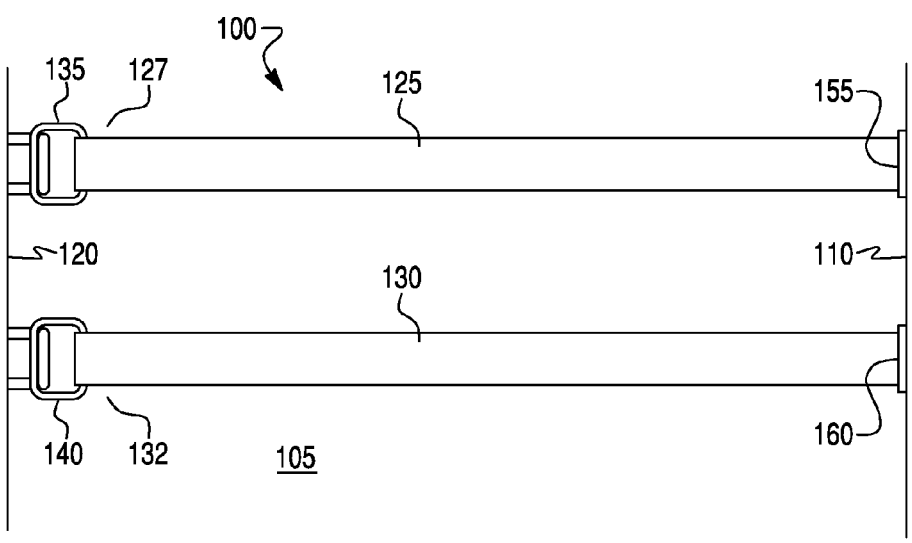
FIG. 2 shows a top view of the cargo support system of FIG. 1.
Figure 3:
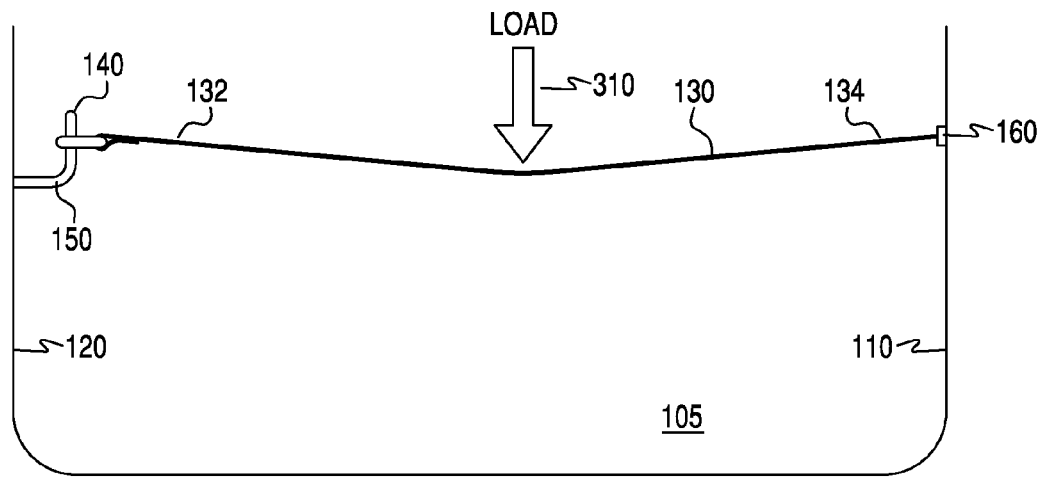
FIG. 3 is an isometric view of the cargo support system of FIG. 1 as viewed from the rear of a vehicle.

FIG. 2 shows a top view of the cargo support system 100 of FIG. 1. The cargo area 105 includes the first belt 125 extending from the first sidewall 110 of the cargo area 105 to the second sidewall 120. A second belt 130 is also provided which extends from the first sidewall 110 of the cargo area 105 to the second sidewall of the cargo area 120. As shown in FIG. 2, the first belt 125 is generally parallel to and spaced away from the second belt 130. In the embodiments of FIGS. 1-3, the width of the belts 125 and 130 in a direction parallel to the sidewalls 110 and 120 is larger than the belt thickness (referring to the belts' height in a direction perpendicular to the width of the belts but also parallel to the side walls 110 and 120, i.e., into the drawing of FIG. 2). Of course it should be understood that the belts 125 and 130 may have other cross-sectional shapes, including belt-like, cord-like, rectangular cross-sectional, etc. FIG. 2 also shows that the first belt 125 is retained at the first sidewall 110 by the first retractor 155 and the second belt 130 is retained at the first sidewall 110 by the second retractor 160. As shown in FIG. 2, the first tie down 145 and second tie down 150 are disposed adjacent the second side 120. The first tie down 145 is capable of engaging the first hook 135 which is disposed at the distal end 127 of the first belt 125, and the second tie down 150 is capable of engaging the second hook 140 which is disposed at the distal end 132 of the second belt 130. Once the first and second belts 125 and 130 are engaged with the first and second tie downs 145, 150, respectively, they can be tensioned and the cargo support system 100 can receive a load.

FIG. 3 is an isometric view of the cargo support system 100 as viewed from the rear of a vehicle in accordance with a disclosed embodiment. FIG. 3 shows the cargo area 105 which is bounded by the first sidewall 110 and the second sidewall 120. The second belt 130 can extend from the second sidewall 120 to the first sidewall 110 across the cargo area 105. A secondary end 134 of the second belt 130 can be retained in tension at the first sidewall 110 by the second retractor 160, while the primary end 132 of the second belt 130 is retained by engaging the second hook 140 with the second tie down 150. The first belt 125 of FIGS. 1 and 2 cannot be seen in FIG. 3 but can be present and spaced away from and substantially parallel to the second belt 130.

FIG. 3 also shows a load 310 represented by the downward arrow. The load 310 is placed on top of and in contact with the first and second belts 125 and 130. As can be seen in FIG. 3, the load 310 causes the belts 125 and 130 to deflect and/or stretch in order to accommodate the weight of the load 310. FIG. 3 also shows that there is additional storage space below the belts 125 and 130.

Figure 4:
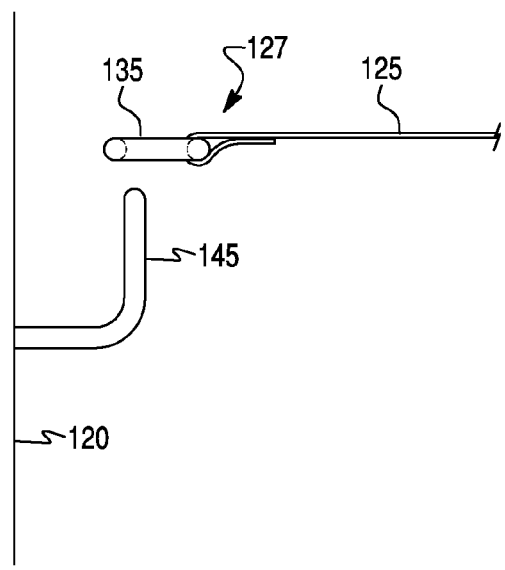
FIG. 4 shows a detailed rear view of the tie down and clip feature of FIG. 1.

FIG. 4 shows an isometric detailed view of a tie down and clip feature in accordance with a disclosed embodiment. The tie down 145 can be mounted on the second sidewall 120 in a fixed position. The first belt 125 can extend toward the second sidewall 120 and have a hook 135 disposed at its distal end 127. The hook 135 is configured so that it can be received by the tie down 145 so that the belt 125 is held in place and in tension. It should be understood that the hook 135 and tie down 145 are exemplary and may take on any number of shapes and sizes or replaced with other structures that effectively allow the belt 125 to be maintained in tension at the second sidewall 120.

Figure 5:
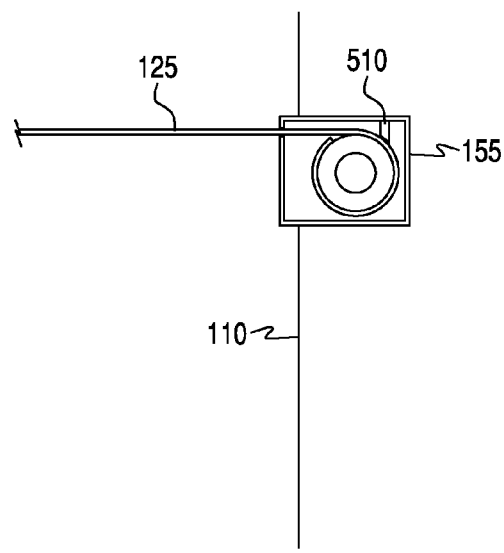
FIG. 5 shows a schematic rear view of the retractor of FIG. 1.

FIG. 5 shows an isometric view of a retractor feature in accordance with a disclosed embodiment. FIG. 5 shows the retractor 155 disposed at the first sidewall 110. The retractor 155 is capable of stowing the belt 125 in a coiled manner. The retractor 155 includes a brake 510 which is capable of engaging the belt 125 so that it can be held in place and/or cinched/tightened to a selected length. In this manner, the belt 125 can be maintained in tension. A release knob can be located adjacent the retractor 155 in the vehicle compartment and connected to the brake mechanism 510 for releasing the tension in the belt and allowing the belt to be withdrawn back into the retractor. The knob can also be connected to the brake 510 in such a way that after the belt 125 is attached across the cargo area, the knob can be turned or otherwise actuated to further tension the belt 125 across the cargo area in a desired configuration. An electro-mechanical device, such as a solenoid or electric motor and associated linkage can also be used to actuate the brake or belt tightening mechanism.

The retractor 155 is exemplary of any device capable of clamping the belt 125 so that it is maintained in tension. For example, the retractor 155 can include a brake or lever that can engage and clamp the belt 125 in a fixed position. The retractor 155 may also be configured to require manual clamping of the belt 125 or configured to automatically clamp the belt 125 via mechanical or even electromechanical means. The retractor 155 may also be tunable to handle varying loads and, in one embodiment, tunable so that the user knows when a maximum load is exceeded. This can be accomplished by setting the retractor 155 so that the clamp/cinch loosens at a preset load.

Figure 6:
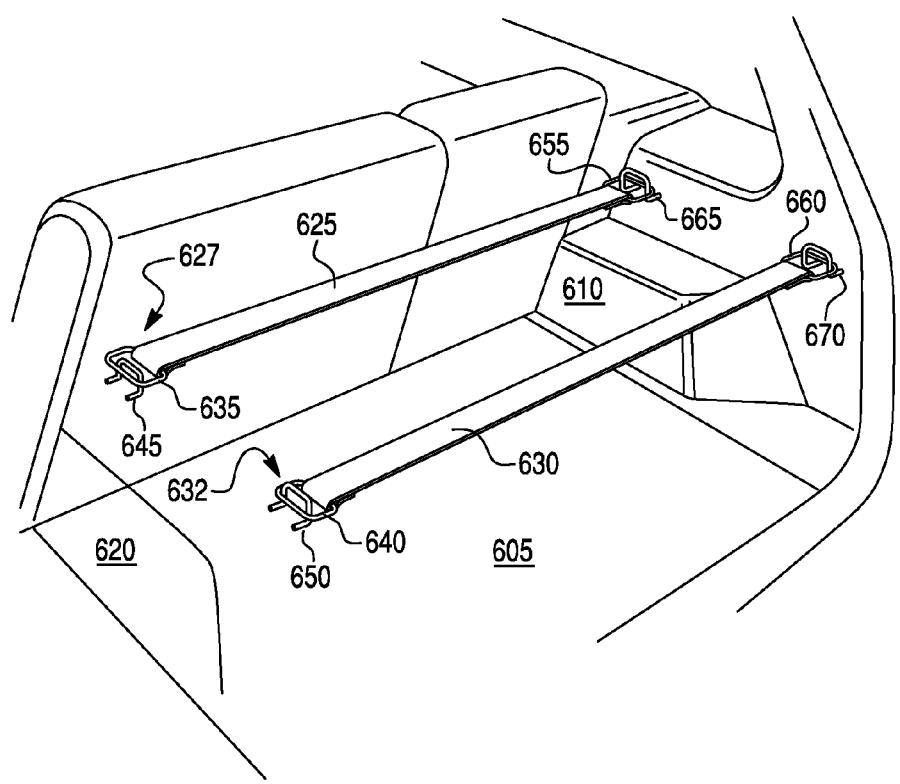
FIG. 6 shows a perspective view of another exemplary embodiment of a cargo support system made in accordance with principles of the disclosed subject matter.

FIG. 6 shows a perspective view of another exemplary embodiment of a cargo support system 600 made in accordance with the principles of the disclosed subject matter. As shown in FIG. 6, the cargo support system 600 is provided in the cargo hold area 605 of a vehicle having a first sidewall 610 and a second sidewall 620. The cargo support system 600 includes a first belt 625 and a second belt 630 which are spaced away from and substantially parallel to each other. In the embodiment of FIG. 6, a primary end 627 of the first belt 625 is provided with a first hook 635, while a secondary end of the first belt 625 is provided with a second hook 655. The first hook 635 engages a first tie down 645 which is adjacent the second side 620. The second hook 655 engages a second tie down 665 which is located adjacent the first side 610. In this manner, the first belt 625 extends across the cargo area 605 and is retained at the first and second tie downs 645 and 665.

FIG. 6 also shows a second belt 630. The second belt 630 is spaced away from and substantially parallel to the first belt 625. A primary end 632 of the second belt 630 is provided with a third hook 640 while a secondary end of the second belt 630 is provided with a fourth hook 660. The third hook 640 engages a third tie down 650 which is adjacent the second side 620. The fourth hook 660 engages a fourth tie down 670 which is located adjacent the first side 610. In this manner, the second belt 625 extends across the cargo area 605 and is retained at the third and fourth tie downs 650 and 670, respectfully.

In operation, the first belt 625 and the second belt 630 are attached to the tie downs 645, 650, 665 and 670, through the use of their respective hooks 635, 640, 655 and 660. The belts 625 and 630 can be sized so that they are maintained in tension. Thus, in this embodiment, the first and second belts 625 and 630 are retained by the first and second tie downs 645 and 660 and 650 and 670, respectively.

As with the embodiment of FIGS. 1 and 2, it should be understood that the cargo area 605 of the embodiment of FIG. 6 may be any area in a vehicle capable of holding cargo, including but not limited to a vehicle trunk, hatchback area or the cargo region of a sport utility vehicle (SUV). Likewise, the belts 625 and 630 described above can be made of various materials that are flexible and have a high tensile strength so that various loads can be placed on the belts.

Figure 7:
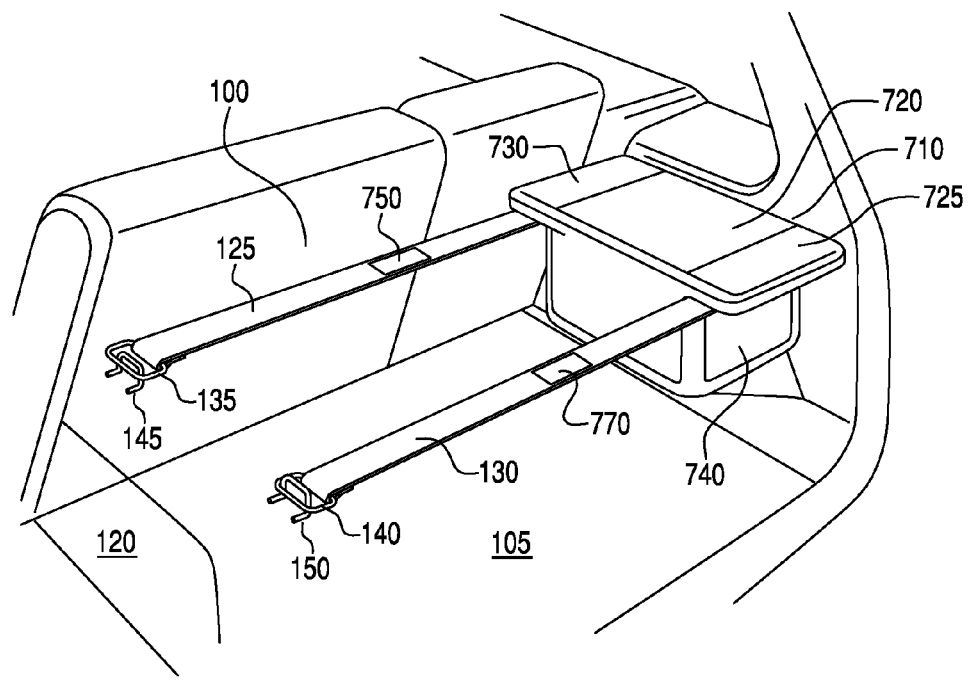
FIG. 7 shows a perspective view of the embodiment of FIG. 1 with a hard storage box in the cargo support system.

FIG. 7 shows a perspective view of the embodiment of FIG. 1 with a hard storage box 710 used in the cargo support system 100 in the cargo area 105 of a vehicle. FIG. 7 shows the first belt 125 spaced away from and substantially parallel to the second belt 130. FIG. 7 also shows the first hook 135 associated with the first belt 125 and the second hook 140 associated with the second belt 130. In FIG. 7, the hard storage box 710 is placed between the first and second belts 125 and 130 so that the belts 125 and 130 act to hold the storage box 710 in place. The tensioned belts 125 and 130 are able to support significant loads in this manner. As shown in FIG. 7, the storage box 710 includes a top 720 and a storage area 740 where various items can be placed for storage. The top 720 includes a first extension 730 and a second extension 725. The first extension 730 rests on the first belt 125, while the second extension 725 rests on the second belt 130. In this manner, the storage box 710 is firmly retained in the cargo area 105.

In one embodiment of the invention, as shown in FIG. 7, the first belt 125 and the second belt 130 may be provided with a first fastener 750 and a second fastener 770, respectively. The fasteners 750 and 770 may be any known fasteners which may come into contact with a bottom side of the first extension 730 and second extension 725 of the storage box 710. For example, the fasteners 750 and 770 may be strips of hook and loop material which come into contact with hook and loop material strips also disposed on the bottom of the first and second extensions 730 and 725. When the hook and loop material strips come into contact with each other, storage box 710 is held firmly in place. Other fasteners may include snaps or adhesives which also act to hold to storage box in place and prevent it from sliding along the belts 125 and 130.

Figure 8:
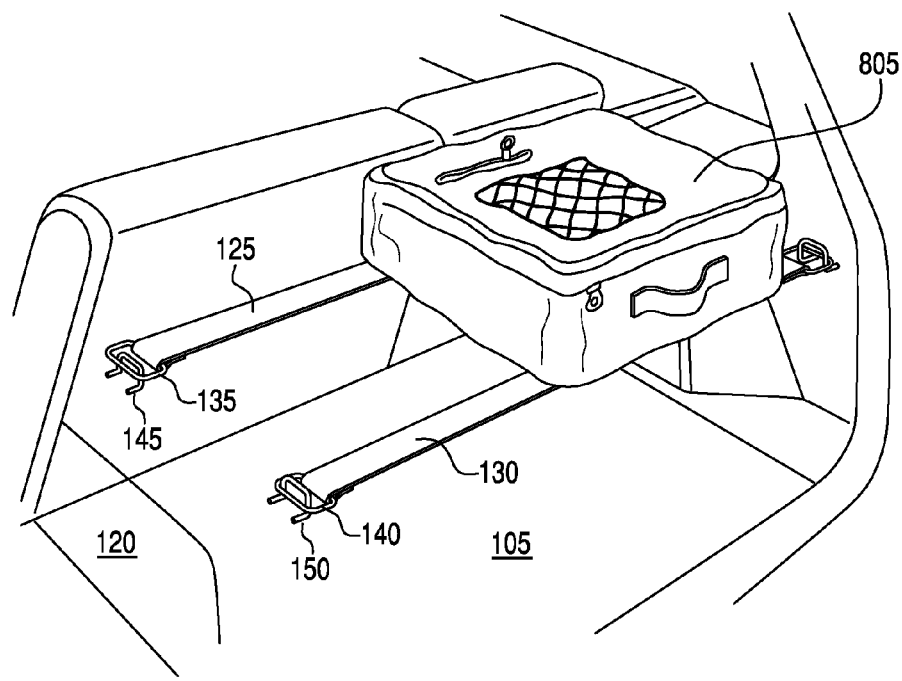
FIG. 8 shows a perspective view an embodiment of a cargo support system including a soft storage container made in accordance with principles of the disclosed subject matter.

FIG. 8 shows a perspective view of another embodiment of a support system that includes a soft storage container 805 placed in the cargo area 105 of a vehicle. The first belt 125 is spaced away from and substantially parallel to the second belt 130 in this embodiment. FIG. 8 also shows the first hook 135 associated with the first belt 125 and the second hook 140 associated with the second belt 130. In FIG. 8, the soft storage container 805 is positioned on top of the first and second belts 125 and 130 which allow it to be stored in the cargo area 105. As shown in FIG. 8, by placing the soft storage container on the belts 125 and 130, additional storage area is available below the first and second belts 125 and 130.

It should be noted that several of the disclosed structures that make up the cargo support system 100 can be varied in terms of shape, size, material, connections, etc., without departing from the spirit and scope of the presently disclosed subject matter. For example, the first and second belts 125 and 130 can be made of any material capable of displacing and/or flexing when a load is applied. The belts 125 and 130 can be of any shape, including a flat, belt-line shape, a cord-like shape and/or a shape having a rectangular cross-section. The first and second hooks 135 and 140 and first and second tie downs 145 and 150 can be any system that allows the first and second belts 125 and 130 to be affixed to the sidewall 110 of the cargo area 105. Furthermore, the hooks and tie downs can be configured differently, such as including differently shaped hooks and tie downs having different connection criteria. The retractors can be any system for clamping the belts 125 and 130 at the sidewall 110, thus allowing them to be maintained in tension, including locking devices, clamps and braking devices which can be manually engaged by a user or automatically or even electromechanically engaged.

The belts 125, 130, 625 and 630 are shown as flat sheet type belts. However, the belts could include support structure sewn or built into the back of the belts to provide greater rigidity. The width of the belts is greater than their thickness by at least a certain degree to provide lateral support to an item supported on the belt. For example, the belts 125, 130, 625 and 630 can be twice as wide as they are thick, or even three, four or eight times as wide as they are thick. The large width vs. thickness ratio of the belts 125, 130, 625 helps prevent the belts 125, 130, 625 and 630 from "rolling" when cargo is placed on top of the belts 125, 130, 625 and 630. A top surface of the belts can be treated with a stick material, such as rubber or other slightly adhesive material, to help keep cargo in place on top of the belts 125, 130, 625 and 630 and to further prevent the belts 125, 130, 625 and 630 from "rolling."

Although the tie downs 145, 150 and hooks 140 are shown as simple hook and catch type structures in the Figures, it is contemplated that the tie downs and hooks could be configured as positive locking structures such as spring clips, ratcheted attachment mating pieces, screw type mating pieces, etc. For example, if each end of the belt 125 included a male threaded structure, and each of the walls 110 and 120 include a mating female threaded structure, the belt 125 could be suspended in the cargo area 105 by screwing either end of the belt 125 male screw structures into the mating female screw structures in the wall. The tensioning of the belt 125 could then be carried out by the attachment process itself (the more the belt male screw structures are screwed in the more tension) and an additional tensioning step separate from the attachment step would not be needed.

While the invention has been described in detail with reference to exemplary embodiments thereof, it will be apparent to one skilled in the art that various changes can be made, and equivalents employed, without departing from the scope of the invention. The foregoing description of embodiments of the invention has been presented for purposes of illustration and description. It is not intended to be exhaustive or to limit the invention to the precise form disclosed, and modifications and variations are possible in light of the above teachings or may be acquired from practice of the disclosed subject matter. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A cargo support and storage system for a cargo area of a vehicle, comprising:
a first vehicle sidewall including first and second secondary attachment structures located thereon;
a second vehicle sidewall including first and second primary attachment structures located thereon;
a first stabilizing element having a primary end with a primary securing structure and a secondary end with a secondary securing structure, the first stabilizing element being extendible from the first secondary attachment structure of the first sidewall to the first primary attachment structure of the second sidewall; and
a second stabilizing element having a primary end with a primary securing structure and a secondary end with a secondary securing structure, the second stabilizing element being extendible from the second secondary attachment structure of the first sidewall to the second primary attachment structure of the second sidewall, the second stabilizing element spaced away from and substantially parallel to the first stabilizing element when the first stabilizing element and second stabilizing element are extended and the first stabilizing element primary securing structure is attached to the first primary attachment structure of the second vehicle sidewall, the first stabilizing element secondary securing structure is attached to the first secondary attachment structure of the first vehicle sidewall, the second stabilizing element primary securing structure is attached to the second primary attachment structure of the second vehicle sidewall, and the second stabilizing element secondary securing structure is attached to the second secondary attachment structure of the first vehicle sidewall,
wherein the first and second stabilizing elements are belts that each have a longitudinal axis extending normal to each of the first and second sidewalls and parallel to a bottom surface of the vehicle cargo area, and each stabilizing element has a rectangular cross section when viewed along the longitudinal axis, wherein a width of each belt parallel to both the first and second sidewalls and parallel to the bottom surface is greater than a thickness of each belt parallel to both the first and second sidewalls and normal to the bottom surface, respectively,
wherein each of the first and second stabilizing elements includes a top surface substantially parallel with the bottom surface of the vehicle cargo area, and wherein each of the top surfaces of the first and second stabilizing elements is configured to directly support a downward load, and
wherein the first secondary attachment structure includes a first retractor disposed at the first sidewall and the second secondary attachment structure includes a second retractor disposed at the first sidewall.

2. The cargo support and storage system according to claim 1, wherein the primary securing structure of the first stabilizing element is configured as a first hook, and the primary securing structure of the second stabilizing element is configured as a second hook.

3. The cargo support and storage system according to claim 2, wherein the first and second primary attachment structures on the second vehicle sidewall are configured as first and second tie downs.

4. The cargo support and storage system according to claim 3, wherein the first hook engages the first tie down so that the first stabilizing element is maintained in tension, and the second hook engages the second tie down so that the second stabilizing element is maintained in tension.

5. The cargo support and storage system according to claim 1, wherein the first and second stabilizing elements are made of a flexible material configured to deflect upon application of a load.

6. The cargo support and storage system according to claim 1, wherein the first retractor is configured to receive the secondary securing structure of the first stabilizing element and the second retractor is configured to receive the secondary securing structure of the second stabilizing element.

7. The cargo support and storage system according to claim 1, wherein the first retractor includes a brake structure configured to lock the first stabilizing element with respect to the first sidewall and maintain the first stabilizing element in tension.

8. The cargo support and storage system according to claim 7, wherein the second retractor includes a brake structure configured to lock the second stabilizing element with respect to the first sidewall and maintain the second stabilizing element in tension.

9. The cargo support and storage system according to claim 1, wherein the first and second retractors each include a tensioning structure configured to tighten the first and second stabilizing elements, respectively, across the cargo area.

10. The cargo support and storage system according to claim 1, wherein the first and second retractors each include a coiling structure configured to coil the unextended first and second stabilizing elements in a coiled state within the first and second retractors, respectively.

11. The cargo support and storage system according to claim 1, wherein the first and second retractors include a manual brake system.

12. The cargo support and storage system according to claim 1, wherein the first and second retractors include an electromechanical brake system.

13. The cargo support and storage system according to claim 1, wherein the cargo support and storage system is disposed in one of a vehicle trunk, a vehicle's rear seating area, and a rear bed area of a vehicle.

14. The cargo support and storage system according to claim 1, further comprising:
a storage box having a container region and a container top, the container top configured to extend from either side of the container region, the container region configured to fit between the first and second stabilizing elements when said elements are extended and locked to the first sidewall and the second sidewall of the vehicle, and the container top having a first extension portion configured to rest on the first stabilizing element and a second extension portion configured to rest on the second stabilizing element when the container region is fit between the first and second stabilizing elements.

15. A method for supporting and storing cargo in a vehicle using the cargo support and storage system according to claim 1, comprising:
providing the first stabilizing element having a primary end and a secondary end;
extending the primary end of the first stabilizing element from the first sidewall of the vehicle to the second sidewall of the vehicle;
providing the second stabilizing element having a primary end and a secondary end;
extending the primary end of the second stabilizing element from one of the first sidewall and second sidewall of the vehicle to an opposing one of the first sidewall and second sidewall of the vehicle in a manner such that the second stabilizing element is spaced away from and substantially parallel to the first stabilizing element when the first stabilizing element and second stabilizing element are extended between the first sidewall and second sidewall of the vehicle.

16. The method for supporting and storing cargo in a vehicle of claim 15, further comprising:
providing the first retractor, wherein extending the primary end of the first stabilizing element from the first sidewall of the vehicle to the second sidewall of the vehicle includes pulling the first stabilizing element from the first retractor.

17. The method for supporting and storing cargo in a vehicle of claim 15, further comprising:
providing a storage box having first and second overhang structures extending from a main body portion;
placing the storage box onto the first stabilizing element and the second stabilizing element such that the overhang structures rest on the first stabilizing element and the second stabilizing element and the main body portion of the storage box extends between and below the first stabilizing element and the second stabilizing element.

18. The cargo support and storage system according to claim 1, wherein the belt of the first stabilizing element is a single continuous belt structure extending continuously and directly from the first element primary securing structure to the first element secondary securing structure, and
wherein the belt of the second stabilizing element is a single continuous belt structure extending continuously and directly from the second element primary securing structure to the second element secondary securing structure.

* * * * *